May 12, 1953 W. G. WEYGAND ET AL 2,638,329
APPARATUS FOR TREATING CHOCOLATE OR THE LIKE
Filed June 5, 1947 4 Sheets-Sheet 1
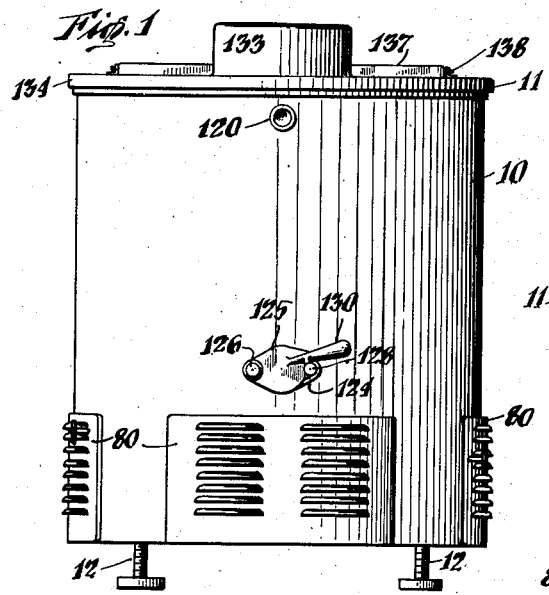
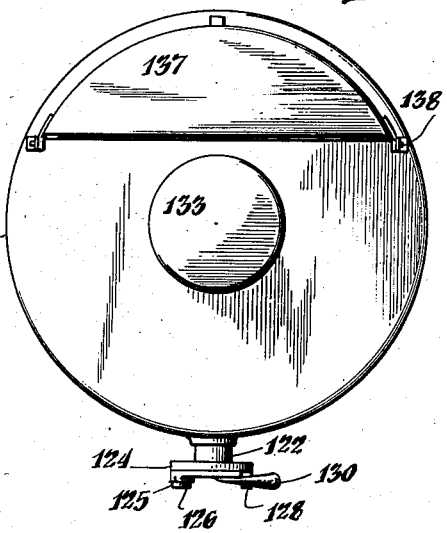
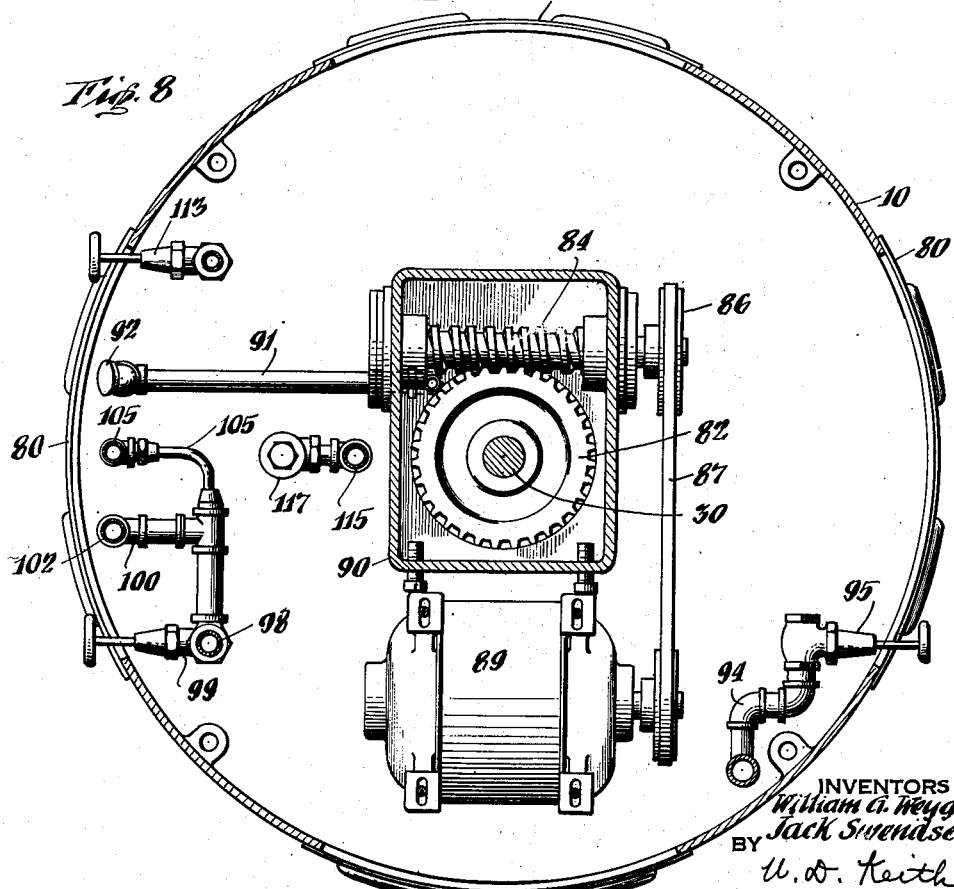
INVENTORS
William G. Weygand
Jack Swendsen
BY
U. D. Keith
ATTORNEY May 12, 1953 W. G. WEYGAND ET AL 2,638,329
APPARATUS FOR TREATING CHOCOLATE OR THE LIKE
Filed June 5, 1947 4 Sheets-Sheet 2

INVENTORS
William G. Weygand
Jack Swendsen
BY
W. D. Keith
ATTORNEY

May 12, 1953 W. G. WEYGAND ET AL 2,638,329
APPARATUS FOR TREATING CHOCOLATE OR THE LIKE
Filed June 5, 1947 4 Sheets-Sheet 3

INVENTORS
William G. Weygand
BY Jack Swendsen
W. D. Keith
ATTORNEY

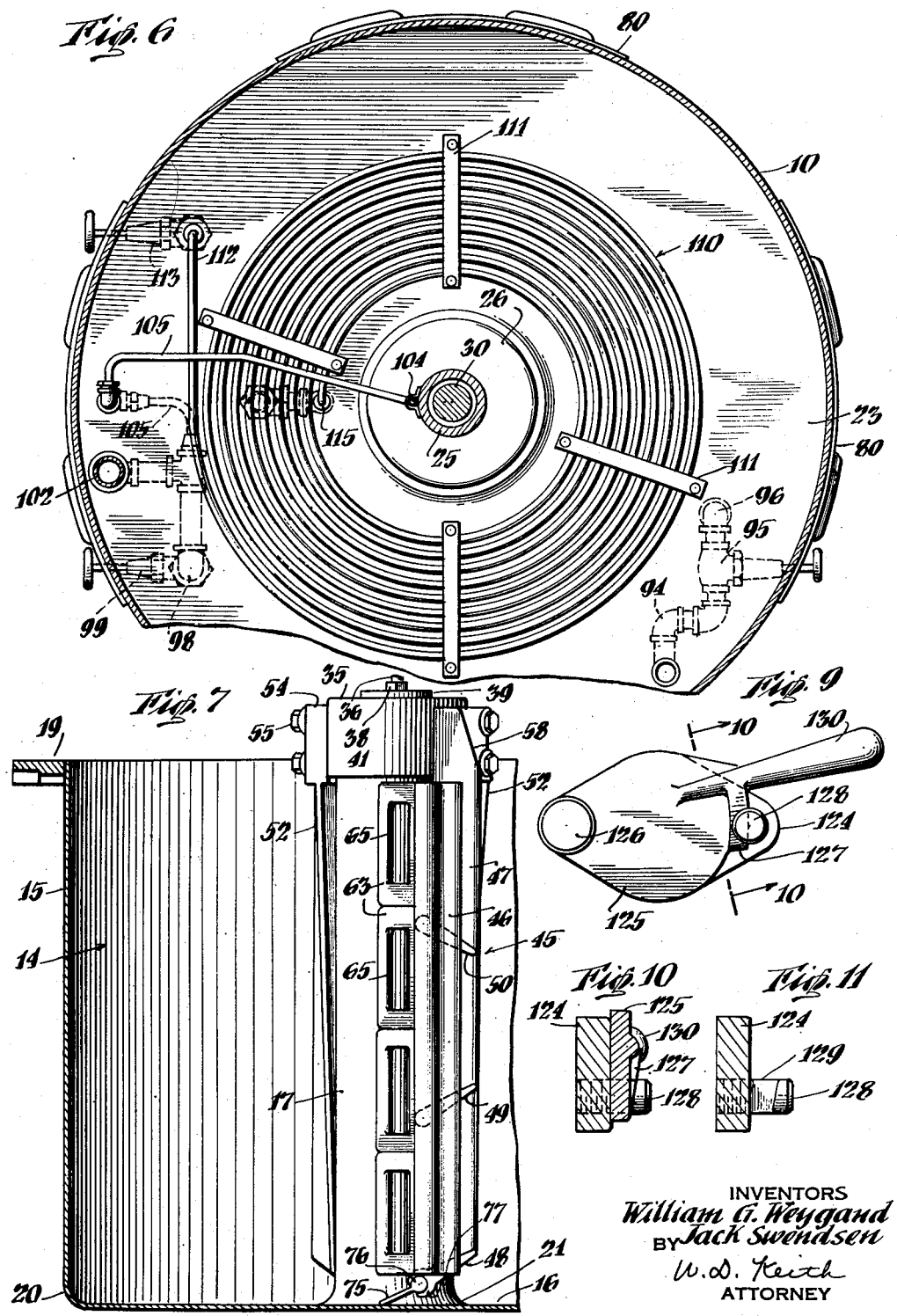

Patented May 12, 1953

2,638,329

UNITED STATES PATENT OFFICE 2,638,329

APPARATUS FOR TREATING CHOCOLATE OR THE LIKE

William G. Weygand, East Meadow, and Jack Swendsen, Lynbrook, N. Y., assignors to Wegner Machinery Corporation, Long Island City, N. Y., a corporation of New York Application June 5, 1947, Serial No. 752,586

3 Claims. (Cl. 259—108)

This invention relates to apparatus for treating chocolate or the like, and more specifically to a chocolate melting and tempering kettle of improved character.

In the candy and other industries, preparation of chocolate usually involves melting and so-called tempering operations, and the necessary apparatus for such treatment presents a twofold problem of considerable magnitude. In the first place, the material itself is difficult to heat and mix, especially for the preparation of a desirably smooth, homogeneous product that is unimpaired by any departure from critical processing conditions of temperature or the like. In the second place, high standards of sanitation must be satisfied, as in cleaning the equipment, after each use, and also in preventing the contamination of the chocolate itself.

More specifically, for example, great care must be taken to avoid over-heating, and yet under safe conditions of temperature the chocolate tends to adhere to the surface of the kettle, preventing adequate agitation and impeding transfer of heat from outside the kettle to interior portions of the mass. In cleaning the equipment after each batch has been processed, it is difficult to remove solidified chocolate, especially from corners and crevices, yet proper sanitation makes it imperative to leave no accumulations or residues in any part of the apparatus, whether or not such deposits may actually come in contact with subsequent batches of the material. It is equally essential to avoid any possibility of contaminating the chocolate, not only with foreign matter that might be deposited from the atmosphere or otherwise, but also with grease, oil, or particles of metal such as might come from the mixing machinery. Since the nature of chocolate makes it practically impossible, by any ordinary observation, to ascertain that contamination is occurring, and since the spoiling or other unsanitary nature of small incrustations of chocolate in the apparatus is equally hard to recognize, extraordinary precautions must be taken to prevent these difficulties; and many prior types of heating and mixing equipment either do not permit such precautions or require an inordinate amount of time and effort to effectuate them.

Accordingly, an important object of the present invention is to provide apparatus of the character described wherein the above problems of operation and sanitation are effectively overcome, affording heating and mixing apparatus which requires a minimum of attention and is easy to use and keep clean, and yet permits superior results in operations such as melting and tempering.

Other and more specific objects are to afford a kettle and agitator structure of novel character, wherein the moving parts can be readily disassembled and easily cleaned; and to provide such apparatus having improved scraper means whereby the interior walls are continuously scraped during the entire operation, so as to permit effective heat transfer, facilitate stirring, and prevent lumping or other undesirable characteristics in the treated chocolate.

A further object is to provide a new arrangement of the kettle, including a cover structure for it, which facilitates cleaning and also prevents the accumulation of inaccessible deposits, however small, of solidified chocolate. A like object is the provision, in such devices, of improved outlet or draw-off means for the melted chocolate, such means being of an effectively sanitary character, protected from dirt, but easily cleaned, and at the same time amply suited for its intended purpose.

Another and particularly important object is to provide a novel and efficient apparatus for heating and agitating a mass of chocolate, arranged to avoid any possibility of contaminating the latter with grease or oil from the machinery, and to avoid any direct exposure of the chocolate to small mechanical parts which might become loosened and broken off and thus be ground or otherwise embedded in the mass. Additional objects are to provide structurally improved agitating means, light in weight, simple in configuration and easy to handle; and a novel arrangement of the driving mechanism, readily accessible and yet adequately separated from the interior of the kettle. Still further objects are the provision of greater mechanical efficiency in the stirring operation, remarkable uniformity and improved thermal efficiency in heating the body of chocolate, and greater convenience in various other respects, e. g. in control or supervision of the supply of water and steam to the heating system, and likewise in effecting the initial installation and connection of the apparatus.

An additional object is to provide improvements satisfying one or more of the foregoing objects, in apparatus useful for processing of other food materials or the like.

To these and other ends, including objects hereinafter apparent or otherwise incidental to the use of the described apparatus, a presently preferred embodiment of the invention is shown in the accompanying drawings and set forth in the following description, by way of example, to illustrate the several novel features and combinations, and the principles underlying them.

Referring to the drawings:

Figs. 1 and 2 are respectively elevational and plan views of the kettle, on a reduced scale relative to the remaining figures;

Fig. 6 is a section on line 6—6 of Fig. 3;

Fig. 7 is an elevational view, taken from line 7—7 of Fig. 3, of the agitator and scraper structure, with the tank in central vertical section;

Fig. 8 is a section on line 8—8 of Fig. 3.

Fig. 9 is an enlarged elevation of the drain valve, closed; and

Figs. 10 and 11 are sections on line 10—10 of Fig. 9, with the valve respectively open and closed.

Figure 3:
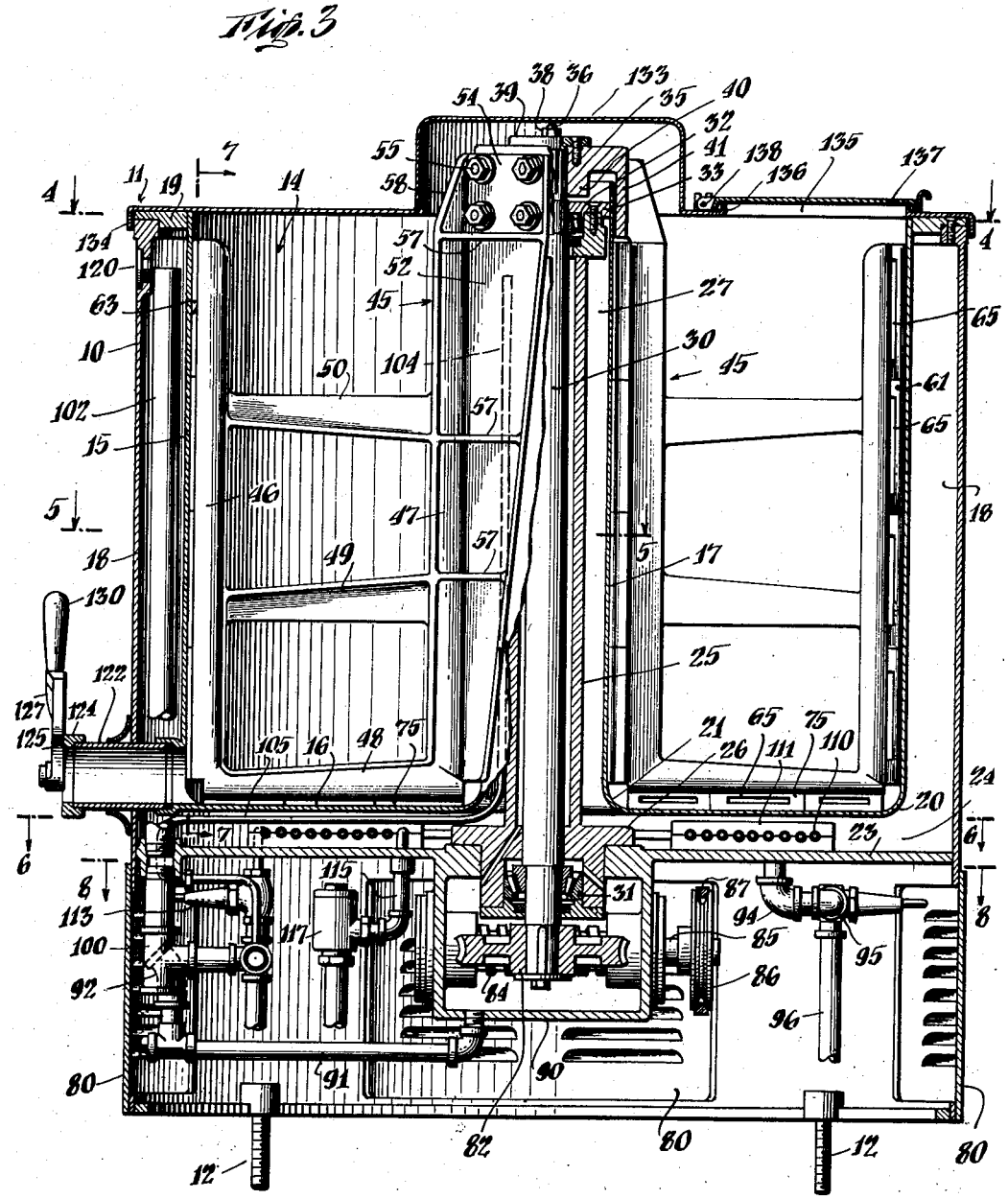
Fig. 3 is a vertical section of the kettle, on a central plane but with certain internal parts shown in elevation.

Referring to the drawings and particularly to Figs. 1 and 2, the illustrated apparatus comprises an external housing 10, in the form of an upright cylinder advantageously made of heavy sheet metal, and a cover 11, likewise of sheet metal. The device is supported in a level position, by four (4) independently adjustable legs 12, preferably with sufficient space from the floor to allow the latter to be cleaned easily at any time.

Turning now to Figs. 3 to 8, it is seen that the kettle comprises an upright inner vessel generally designated 14 and having a cylindrical outer wall 15 and a flat bottom 16 from which a central tubular column 17 projects upwardly within the wall 15 and preferably to a point well above it. The wall 15 has a shorter radius than the housing 10 so as to provide a water jacketing space 18 between them, and the upper end of the space 18 is closed by a heavy, horizontal flange 19 integral with or welded to the wall 15 and seated on the inwardly flanged upper edge of the housing 10, from which the vessel 14 is thus hung. The wall 15, bottom 16 and central column 17 define the chocolate receiving vessel and are preferably welded or otherwise constructed so as to afford a smooth, continuous interior surface without flanges, shoulders or sharp inside corners, it being noted that the corners between the bottom and the concentric cylindrical surfaces 15 and 17 are appropriately rounded, as shown at 20, 21. This entire structure, for example, may be made of polished stainless steel sheet, making it still easier to clean and also facilitating both the scraping operation in the chocolate mass and the transfer of heat through the walls.

The housing 10 has a relatively heavy, horizontal partition 23 spaced below the bottom 16 of the vessel to provide a further water jacketing region 24, and an internal tubular column 25 is mounted, as by a flanged base 26, to extend upwardly from the partition and within the column 17. The concentric columns are spaced to provide an annular water jacketing region 27, which is in full and open communication with the horizontal jacket 24, as is also the outer jacket 18. The jacketed column structure is internally traversed, i. e. through the tubular element 25, by a central, coaxial shaft 30, journaled near its lower end in a suitable roller bearing 31 in the base 26, and near its upper end in a like roller bearing 32 secured within the column 17. The upper bearing 32 is disposed well below the top of the column 17, and rests on the upper edge of the column 25, which is correspondingly shorter; the bearing also has a cover 33 fastened in sealed relation to the interior of the column 17, and closely surrounding the shaft. Thus it is effectively impossible for lubricant in the bearing or on the shaft below to work its way up to and over the top of the column 17. The combination of the cover 33, the case for the bearing 32 and the column 25 may also provide some central support for the vessel 14, on the partition 23.

The upper end of the shaft 30 above the bearing is splined or squared to receive the congruently shaped central opening of a collar-like head 35 which can thus be slid down over the shaft for rotation by the latter. The shaft carries a threaded stud 36, upon which a nut 38 may be screwed, to engage a correspondingly apertured end plate 39 secured on the head 35, i. e. so as to lock the latter in place.

The inner collar portion 40 of the head 35 extends within the tubular column 17, and the head also has an outer skirt 41, depending for a considerable distance down the outside of the column. Agitator and scraper members for the interior of the vessel 14 are attached to the head 35 as described below; but it will now be more fully appreciated that by virtue of the central column arrangement and the instrumentalities in and around it, there is no effective communication between any lubricant-carrying portion of the shaft 30 and the interior of the kettle 14, and the water jacketing spaces are entirely sealed from both the shaft and the kettle. Thus not only is contamination of the material in the kettle positively prevented but also, chiefly because of the skirt 41, there is no opportunity for chocolate to be splashed or carried into the driving parts.

Although other forms of agitator or scraper structure may be mounted on the head 35 for continuous or intermittent displacement by the shaft, and although more or less stirring elements may be provided in some cases, the illustrated machine advantageously includes a pair of oppositely disposed agitating and scraping assemblies, generally designated 45. Since these assemblies are conveniently identical in structure, except in being mounted on diametrically opposite sides of the head 35, particular description of one of them will suffice for reference to both.

As shown, the assembly 45 comprises a pair of upright members or blades 46, 47 (see particularly Figs. 3, 4, 5 and 7), respectively near the wall 15 and the cylindrical surface of the column 17. The vertical blades are connected by transverse members such as the blade 48 near the bottom 16 of the vessel, and spaced, intermediate stirring blades 49, 50, the uppermost blade 50 being also spaced considerably below the top of the kettle and likewise beneath the surface of the body of chocolate when the kettle is full. The inner vertical member 47 projects integrally from a coextensive supporting element 52 which has the shape of a fragment of a cylinder concentric with the column 17, tapering in its circular dimension from a large arc at the top to a small one at the bottom. The part 52 also has an extended portion 54 at its upper end shaped to fit the outer surface of the skirt 41 (of the head 35), where it is fastened by nuts on threaded studs 55 projecting from the skirt. Although other types of construction may be employed, the entire agitator assembly of the members 46—50 with the supporting member 52 and its extension 54 may advantageously be a single, integral casting, e. g. of aluminum or other light metal. For reinforcement, additional, integral flanges or ribs may be provided, as at 57, 58 between the blade 47 and various localities of the member 52.

Figure 4:
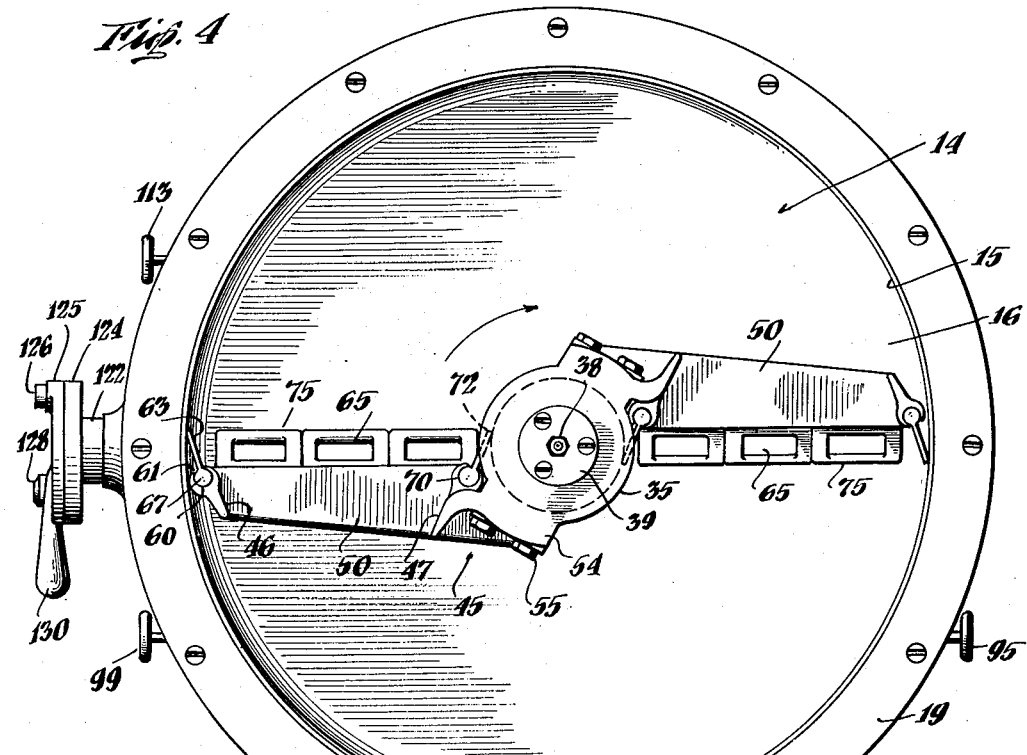
Fig. 4 is a section on line 4—4 of Fig. 3.
Figure 5:
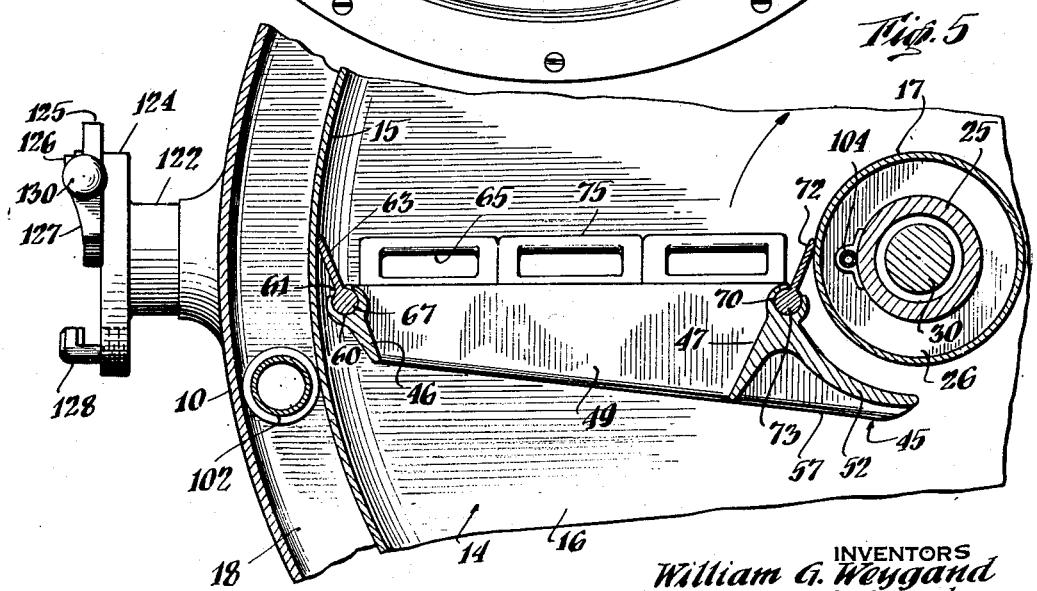
Fig. 5 is an enlarged fragmentary section on line 5—5 of Fig. 3.

As the shaft 30 rotates the head 35 both of the agitator assemblies hung from the latter are swung around the vessel, i. e. in the wide annular space between the outer wall 15 and the column 17. Each assembly has its edges somewhat spaced from the surfaces of the vessel and carries supplemental structure for continuously scraping the latter. In accordance with a further and presently preferred feature of the invention, the scraping means is removably pivoted or hinged to the agitator frame. Thus for instance, an outer edge portion of the blade 46 has a vertical, undercut groove 60 constituting a long cylindrical or tubular recess opening through a co-extensive, axially extending slot 61 toward the outer wall 15 of the vessel, the slot preferably facing the wall at an acute angle, as shown in Figs. 4 and 5.

Supported by the groove 60 are a plurality of scraper elements 63 arranged in tandem, each comprising a flat or blade-like portion having a central opening 65 to facilitate passage of the blade through the chocolate (see also the similarly identified openings in the bottom blades hereinbelow described, Figs. 4 and 5), and an enlarged base or head 67 of elongated cylindrical shape to fit the tubular groove 60 with the blade portion projecting. In this way each scraper 63 is hinged to the agitator assembly, the base 67 constituting a pin that can be slid endwise into the pin receiving groove 60. The spacing of the member 46 from the wall 15 is preferably such that the scrapers meet the latter at a relatively sharp acute angle, while the hinge arrangement, wherein the slot 61 is considerably wider than the blade 63, permits the scraper to turn or rock as necessary for more perfectly following the contour of the wall. Although in some instances a single long scraper may be provided, a more freely pivoted support and a better scraping operation have been achieved by using a tandem, i. e. end-to-end series of scraper elements, for example four, as shown.

The inner blade 47 has an identical pin receiving groove 70 to hold a similar series of scraper elements 72 in removable, hinged relation by their pin-like bases 73, for scraping engagement with the outer surface of the central column 17. The same kind of arrangement is also provided to scrape the bottom 16 of the vessel, including a plurality of scraper elements 75, e. g. three in tandem, having pin-like portions 76 removably held in corresponding horizontal grooves 77 at the edge of the cross member 48. Thus both of the agitator assemblies 45 are equipped with pivoted blades on all three sides, and as the assemblies revolve in the kettle to stir the chocolate, all of the surfaces are effectively and continuously scraped. If desired, the lower end of each groove 60, 70 and one end of the groove 77 may have stop means, such as a small inwardly projecting stud (not shown) to help hold the scraper blades in place, especially when the agitators are being inserted in the kettle.

Various driving and connecting parts of the machine are disposed in the space below the partition 23, to which access may be had through a plurality of large openings in the housing 10, each normally closed by a removable louvered plate 80. The lower end of the shaft 30 (Figs. 3 and 8) carries a worm gear 82 engaged by a worm 84 on a horizontal shaft 85 which in turn carries a pulley 86 to be driven by a belt 87 from a suitable source of power such as an electric motor 89 (Fig. 8). The described gearing is enclosed in a housing 90 depending from the partition 23 and filled with lubricating oil to a predetermined level by means of an oil filler conduit 91 including an upstanding, removably capped filler pipe 92 behind one of the access plates 80.

The jacketing space 18, 24, 27 may be filled with water through an inlet conduit 94 that opens through the partition 23 and that has a valve 95 and extends through a further pipe 96 to a source of water supply, not shown. To drain the water at desired times, a similar conduit 98 opens into the jacketing space at the partition and extends through a valve 99 to a T 100 which may have its lower branch piped to a suitable waste conduit, likewise not shown. An over-flow pipe 102 is disposed in the jacketing space 18, for example in the position shown in Figs. 5 and 6, slightly forward of the plane of Fig. 3, where it is also shown, for completeness. The upper, open end of the pipe 102 thus determines the level to which water will rise in the jacket, and its lower end connects with the drain T 100. Since the space 27 in the central column is closed at the top, a small vent pipe 104 extends up into it, opening at the same level as the over-flow pipe 102, and also having a lower portion 105, connecting with the drain T 100, as shown in Figs. 3, 6 and 8.

Among various heating means that may be used, a particularly convenient arrangement comprises a spiral coil of tubing 110, having a multiplicity of turns generally concentric with the vessel and its central column and disposed in the jacketing space 24. The coil is thus held by appropriate supports 111 between the bottom wall 16 of the vessel and the partition 23. A steam supply conduit 112 including a valve 113 opens into one end of the coil, and the other or inner end communicates with an output pipe 115 to discharge steam through a suitable radiator trap 117. Although it will be understood that other steam-controlling instrumentalities may be employed, in fact preferably including thermostatic means for maintaining the steam or the water or indeed the interior of the kettle at a selected temperature, the present illustration has been simplified by showing only the single valve 113 for adjusting the supply of steam to the heating coil 110. It will be noted that the several valves 95, 99 and 113 are conveniently so arranged that their operating handles project outside the housing 10, for ready access.

For observation of the water level in the jacketing spaces a sight window 120 (Figs. 1 and 3) is provided in the housing 10 near the top, preferably so disposed that the level of the openings of the pipes 102 and 104 is midway between the upper and lower edges of the window. Thus when the jacket is properly filled, the water level should be seen at the center of the field of view, it being remembered that the over-flow pipe 102 is actually somewhat spaced from the window (Fig. 5), rather than across it as might appear from Fig. 3 alone.

For withdrawal of melted chocolate, a short, cylindrical conduit 122 opens into the vessel 14 and projects through the outer housing 10. The lowermost region of the inner surface of the conduit 122 lies in the plane of the bottom 16 of the vessel and the joint between the conduit and the vessel wall is made to be entirely smooth and without projecting shoulders or depressions, to avoid entrapment of the chocolate material. Referring to Figs. 9–10 as well as Figs. 2–5, the outer end of the conduit carries a flange 124 apertured in exact conformity with the conduit and having a vertical face across which a gate 125 is disposed to slide, the gate being pivoted at 126, at one side of the flange. A peripheral region 127 of the outer face of the gate is tapered or wedge-shaped, and the flange carries a stud 128 having a large notch 129 correspondingly tapered at its outer wall (i. e. with the same small angle). Thus when the gate, operated by its handle 130, has been swung clockwise from open position through the partially open relation of Figs. 3 and 5, and is approaching the closed position of Figs. 2, 4, 9 and 10, the wedge-shaped portion 127 is forced into the notch 129, in a direction lengthwise thereof. The gate is thus brought to a stop and the wedging action of the notch on the gate face 127 presses and holds the plane surface of the gate very firmly against the flange 124.

The described assembly thus constitutes a gate valve, of simple but peculiarly effective form, to close the drain spout. To open the valve and permit discharge of fluid or semifluid material from the vessel, the handle is swung upwardly, sliding the gate 125 across the flange seat 124, uncovering the opening in the latter. The contents of the vessel 14 may then flow easily into a suitable collecting container placed under the opening, the conduit 122 projecting sufficiently, as shown, to permit ready location of such container. It will be particularly noted that the valve structure is of completely sanitary character, in that there is a minimum of mechanism, and the single moving part is fully exposed and accessible for cleaning. There are no crevices or other localities to accumulate a deposit of chocolate and the face of the flange 124, over which the chocolate runs on discharge, is fully covered and protected by the gate member 125 during periods of closure. At the same time, by virtue of the described wedging and locking action of the stud 128 on the gate a remarkably tight and drip-proof closure is obtained for the spout, yet it can be easily opened to a wide extent for removal of the melted product.

The cover 11 for the vessel is preferably pressed or otherwise fashioned from a single piece of stainless steel or like sheet material and includes an upstanding cylindrical, recessed portion 133 to house the upper end of the drive shaft 30, the collar 35 and associated parts. The cover is circular in plan and has a short depending skirt 134 fitting snugly around the top outer edge of the housing 10. At one side the cover has a segment-shaped opening 135 surrounded by a flange 136 struck up from the sheet metal and provided with a supplemental sheet metal cover 137 of like shape, which is skirted to fit over the flange 136 and which is hinged by ears at the ends of its straight side 138 so that it may be raised for filling the vessel, inspection of contents or addition of further material. It will be noted that the cover structure, particularly as made of smooth sheet material, has a correspondingly smooth surface facing the interior of the kettle 14, without crevices or other regions where chocolate might become inaccessibly lodged. The flanged filling opening 135 is similarly free of such crevices; the simple structure throughout facilitates cleaning, and for the latter purpose the entire cover assembly can be readily removed simply by sliding it up against its frictional grip around the housing wall 10.

The apparatus has been found convenient to install, simple to use and remarkably efficient in operation. Piping connections for water, steam and water drainage are readily effected beneath the raised open bottom of the housing 10, and likewise electrical connection to the motor 89, while subsequent access to these and other mechanical parts is easily obtained as described hereinabove. At the same time, all of the mechanism, piping and the like is completely shielded from access by the chocolate, thus avoiding deposit of the latter on difficultly cleaned mechanical parts.

In operation the agitating and scraping assemblies, mounted on the head 35 are inserted in the vessel over the end of the shaft 30, and secured by tightening the single nut 38. The cover is applied and the desired quantity of chocolate and other ingredients, if any, may be inserted through the opening 135. Assuming that the jacketing spaces 18, 24 and 27 have been filled with water to the level of the pipes 102 and 104, and assuming that steam of the desired temperature and pressure has been admitted to the heating coil 110, the apparatus is ready for operation. At the outset or other desired stage in the melting processes, the drive mechanism may be started, turning the agitator assemblies, clockwise as seen in Figs. 4 and 5, for example at a rate of about 20 R. P. M. The heater element raises the temperature of the water in the jacketing spaces to the desired value, and since those spaces not only surround the sides and bottom of the vessel but also adjoin the upstanding cylindrical column 17, a particularly rapid and effective transfer of heat to the chocolate is effected. The central location of the heater elements provides a balanced, uniform heating effect in both the outer and inner vertical jackets, and the relatively thin-walled structure of the vessel greatly facilitates heat transfer to the chocolate, in contrast to prior types of iron kettles. Since the drain conduit 122 traverses the jacketing space, the material in it is also effectively heated and kept fluid so that when the operation on one batch is completed, the kettle contents can be readily drawn off.

As explained above, the agitator assemblies not only stir the mass but their blades 63, 75, 72, scrape practically the entirety of the side wall, bottom and column wall as the drive shaft turns. This action promotes the desired mixing and uniformity of the material and also greatly facilitates heat transfer, by preventing the accumulation of a layer of poorly heat conducting chocolate on the interior surfaces of the kettle. The arrangement of multiple blades hinged to the support is self-aligning and effects good scraping contact with the surfaces at all times; and the angular relation of the blades is such that the mass of chocolate ahead of the moving assembly, particularly adjacent either wall or the bottom, effectively forces the blade against the surface to be scraped.

The like angular disposition of the vertical and bottom agitator blades 46, 47, 48 is effective to the same end, as well as in providing turbulence and agitation of the chocolate mass, in that the latter is continuously forced through an opening (somewhat like a shallow funnel) smaller than the radial dimension of the kettle between the outer wall and the central column. The corresponding angular arrangement of the transverse blades 49, 50 (see Fig. 7) cooperates in exactly similar fashion toward effecting turbulence and thus vigorous agitation of the mass traversed by the described assemblies. The scraper blades may be made of stainless steel slightly less hard than the walls of the vessel so as to avoid scoring or roughening the polished wall surfaces.

As indicated hereinabove, all chocolate-exposed parts are such that they may be very easily taken apart and cleaned. Thus the cover 11 is removed, the nut 38 unscrewed and the entire stirring structure simply lifted out as a unit. The simple, smooth and massive configuration of the agitators, their lightness of weight and the open nature of the grooves 60, 70, 77, greatly facilitate scrubbing operations on these parts, and similar characteristics are of corresponding advantage in cleaning the smooth interior of the vessel 14, the drain spout and its valve, and if necessary to wash it, the outside of the housing 10. If desired, the agitator assemblies 45 can be unbolted from the head 35, although ordinarily they need not be. At the same time, the structure is exceptionally sturdy, the support of the vessel 14 being such that it can be built to have a capacity of 1200 pounds or more of chocolate. Finally, as also explained, the arrangements including the disposition of driving parts below the kettle and the shielding function of the column 17, avoid the use of stuffing boxes and amply protect the chocolate against contamination with oil, grease, small metal parts, or the like, from the mechanism.

Although the described machine is of outstanding and indeed unique advantage for its stated operations in the treatment of chocolate for the manufacture of confectionery and the like, it will now be appreciated that various features and combinations may be applied to other apparatus or for other uses, e. g. as in the melting, mixing or processing of other viscous or thermoplastic materials, and especially in handling and treating other food compositions which are fluid or semi-fluid and which require a high standard of sanitation.

It is to be understood that the invention is not limited to the specific structures herein shown and described, but may be embodied in other forms without departure from its spirit as defined from the following claims.

We claim:

1. In apparatus of the character described, in combination, a vessel having a smooth interior surface comprising a cylindrical outer wall, a concentric cylindrical column and a bottom between them, agitator structure for the region between the column and the outer wall, said agitator structure including a frame having vertical members respectively adjacent the wall and column and a horizontal member adjacent the bottom, supplemental stirring members connecting said upright members, and scraper blades removably hinged at the edges of said upright members and lower member, for scraping the cylindrical wall, central column and bottom respectively, a shaft traversing the central column and means removably securing the inner one of said upright members to a portion of the shaft above the column, said blades and members including parts freely separable upon sliding the blades longitudinally relative to the members, for providing the aforesaid removably hinged attachment of the blades to the members.

2. In apparatus of the character described, in combination, a vessel having a smooth interior surface, comprising a cylindrical outer wall, a concentric cylindrical column and a bottom between them, agitator structure for the region between the column and the outer wall, movable along a predetermined path, said agitator structure including a frame having vertical members respectively adjacent the wall and column and a horizontal lower member adjacent the bottom, supplemental stirring members connecting said upright members, and scraper blades removably hinged at the edges of said upright members and lower member and adapted to project forwardly of the agitator structure in its path for simultaneous scraping engagement with the wall, the column and the bottom at an acute angle, the said upright members and lower member having blade-like configurations disposed to be in alignment with the scraper blades when the latter are in the aforesaid engagement with the outer wall, the column and the bottom so that said upright members and lower member and the scraper blades associated therewith, when moving cooperate in plough-like engagement with material in the vessel to cause the pressure of said material to hold the blades against the outer wall, the central column and the bottom.

3. In a vessel of annular configuration about a vertical axis with inner and outer concentric vertical surfaces and a connecting bottom, an agitator structure comprising a frame having a portion to be connected to a shaft at the axis for revolving the frame about said axis, said frame comprising upright members to be disposed respectively adjacent the inner and outer vertical surfaces defining said annular configuration and a lower horizontal member disposed adjacent the bottom of the vessel between said upright members and vertically spaced intermediate horizontal members joining said upright members, both said vertical and at least two of said horizontal members having blade-like configurations tilted at cooperating acute angles to the annular path of the frame to provide a shallow funnel-like opening through which material in the vessel is forced as the frame is revolved about the aforesaid axis, said frame having undercut grooves along the outer edges of the upright members and the lower edge of the lower horizontal member and said agitator structure including scraper blade members with elongated, enlarged bases removably disposed in said grooves, thereby pivotally mounting the blade members to project obliquely from the frame for scraping engagement respectively with the inner and outer vertical surfaces of the annular vessel and with the bottom thereof.

WILLIAM G. WEYGAND.
JACK SWENDSEN.

(References on following page)

References Cited in the file of this patent

UNITED STATES PATENTS

| Number | Name | Date |
|---|---|---|
| 345,251 | Muser | July 6, 1886 |
| 644,649 | Walter | Mar. 6, 1900 |
| 729,310 | Fawkes | May 26, 1903 |
| 737,973 | Taylor | Sept. 1, 1903 |
| 1,154,772 | Hollstein | Sept. 28, 1915 |
| 1,195,181 | Bourell | Aug. 22, 1916 |
| 1,219,491 | Santicola | Mar. 20, 1917 |
| 1,349,235 | Stout | Aug. 10, 1920 |
| 1,533,409 | Hartshorn | Mar. 14, 1925 |
| 1,657,524 | Camp | Jan. 31, 1928 |
| 1,869,766 | Morrow | Aug. 2, 1932 |
| 1,870,557 | Curd | Aug. 9, 1932 |
| 1,920,567 | Keck | Aug. 1, 1933 |
| 1,956,613 | Corn et al. | May 1, 1934 |
| 1,995,465 | Bigelow et al. | Mar. 26, 1935 |
| 2,082,752 | Lewis et al. | June 1, 1937 |
| 2,159,450 | Parcell | May 23, 1939 |
| 2,166,753 | Derleth | July 18, 1939 |
| 2,201,212 | Valentine | May 21, 1940 |
| 2,207,884 | Holmen | July 16, 1940 |
| 2,255,986 | Rapisarda | Sept. 16, 1941 |
| 2,275,705 | Wagner | Mar. 10, 1942 |
| 2,280,529 | Mojonner et al. | Apr. 21, 1942 |
| 2,412,573 | Fraser | Dec. 17, 1946 |